Dec. 14, 1954     R. A. HIRSCHMUGL     2,697,010
ROLLER SKATE WHEEL
Filed July 13, 1951
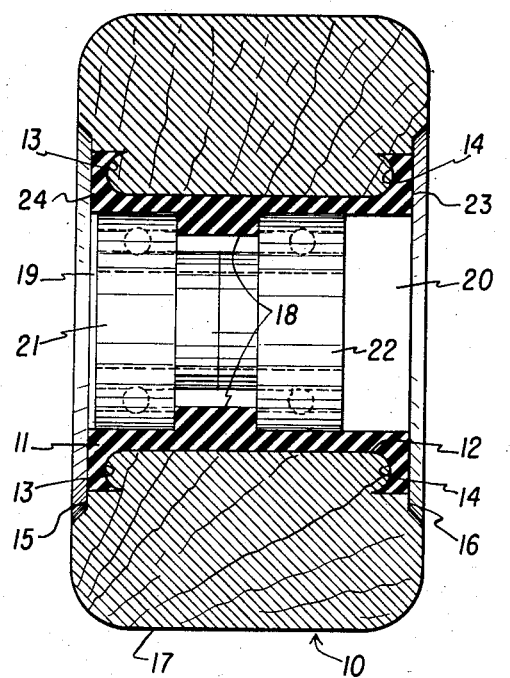
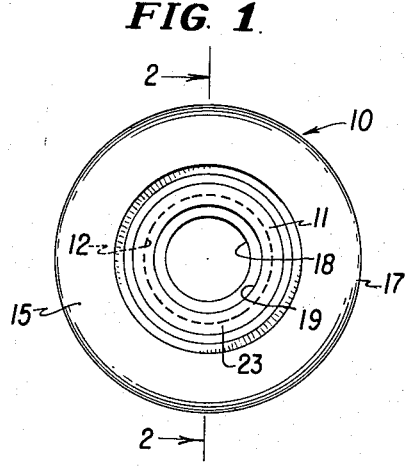
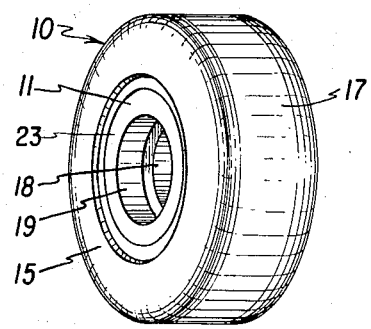
INVENTOR.
Robert August Hirschmugl
BY
*Smith, Olsen & Baird*
Attys.

United States Patent Office 2,697,010
Patented Dec. 14, 1954

2,697,010

ROLLER SKATE WHEEL

Robert August Hirschmugl, San Leandro, Calif.

Application July 13, 1951, Serial No. 236,642

7 Claims. (Cl. 301—5.3)

The present invention relates in general to a wheel or roller construction and more particularly to a wheel or roller of the type which is suspended for rotation on precision ball or roller bearings and which is commonly employed in roller skates, furniture casters and the like.

In the manufacture of roller skate wheels, various materials, including wood and fiber, have been employed to provide the body or tread portion and various arrangements have been utilized in attempting to provide a bushing therein which will satisfactorily support the wheel by means of precision roller bearings or the like on an axle of a roller skate. Roller skates of the foregoing type are normally used on hardwood floor indoor rinks.

In wood or fiber roller skate wheels, metal rings or cup-like bushings for accommodating the precision bearings are forced into the central hub portion of the wood body or tread of a roller and are generally secured in place by various types of interlocking arrangements. Since the roller skate wheels are subject to terrific abuse during normal use by most skaters incident to the relative speeds of wheel rotation, sudden stops in which the wheels are held in contact with the floor at an angle with respect to the normal plane of wheel rotation, the side thrust created by the skater in propelling himself around the rink, and jumping of the skater, the bushings work loose from the woor or fiber tread portions of the rollers.

Another factor that must be carefully considered in the manufacture of wood wheels for roller skates is the quality and condition of the wood. In the manufacture of wood skate wheels, hard maple is generally employed and it must be carefully selected to be free from knots and other imperfections and it must be carefully kiln-dried. However, even though extreme care is taken in selecting and drying the wood, it has been found that it will expand and contract with changes in air moisture and temperature. Consequently, after the wood has been formed into the shape of a wheel and metal bushings are secured thereto, the wood may vary sufficiently to cause the metal bushings to become loose in the wheel and render the same defective.

Also in assembling the metal bushings into the body portions of wood or fiber wheels the manufacturer must exercise extreme care to make certain that the metal bushings are mounted concentrically with respect to the outer peripheral surface of the roller. In addition to the foregoing, the manufacturer must make certain that the metal bushings, when mounted on the precision bearings carried by the axle of the roller skate, will rotatably support the wood or fiber roller on the bearings in a plane perpendicular to the axis to the skate axle. If the bushings of a roller skate wheel are not concentric with the periphery of the wheel, the assembled wheel will be out of balance and it will create considerable vibration and noise. Also, if the metal bushings of a roller skate are not perpendicular to the axis of the supporting skate axle or if the two bushings on each roller are not in exact alignment either axially or in spaced apart perpendicular planes, the wheel will bind on the bearings and will not rotate freely.

It has also been found that even though all of the foregoing precautions are carefully considered, and extreme care is exercised in assembling a roller skate wheel of the type noted, the wheel in operation sets up vibrations which create an extremely objectionable howl or squealing noise which is referred to in the trade as "crying." It has been ascertained that the "crying" noise is created at the time a skater turns the skate at an angle with respect to the direction of travel in order to break or stop his forward movement. It has also been ascertained that the "crying" noise is created near the end of each stride or glide of the skate as the skater propels himself in a forward direction. It has also been ascertained that the "crying" noise is generated by vibrations set up between the wood or fiber body portion of the roller and the metal bushings therein, between the metal bushings and the precision bearings, and between the bearings and the roller skate axle. Each of the foregoing contribute individually to create the "crying" noise.

At least one manufacturer in attempting to improve hardwood roller skate wheels, die-cast a zinc alloy bushing in the roller in such a way that the shrinkage of the metal casting in cooling grips the sides of the wood or fiber roller and thus eliminates the possibility of relative movement between the die-cast bushing and the body portion of the roller. The above mentioned die-cast bushings form a hub which serves as a seat portion for oppositely disposed precision roller bearings which rotatably support the roller on a skate axle. Therefore, it is necessary to bore or ream the two bearing seats so that they are slightly larger than the exact outside diameter of the precision roller bearings to be fitted therein. This is necessary, due to the fact that the zinc alloy in being die-cast to the roller can not be held to close tolerances. Roller skate wheels constructed in this manner, do not however, eliminate the objectionable "crying" noise previously noted and, in addition thereto, within a relatively short period of time after a new wheel is placed into use the noise increases due to the fact that the precision bearings begin to wear away portions of the zinc alloy bushings.

It is therefore the principal object of the present invention to provide a light-weight but extremely durable roller skate wheel assembly which will entirely eliminate the "crying" noise previously noted and which is relatively economical to manufacture.

It is a further object of the invention to entirely eliminate metal bushings in the roller skate wheel assembly and to provide in place thereof a light-weight hub or bushing of resilient plastic material which is molded directly to the wood or fiber body portion of a roller and formed integrally therewith. By employing plastic instead of metal bushings in the body portion of a roller the total weight of an assembled roller skate wheel is materially reduced.

It is still another object of the invention to provide in a roller for a skate wheel, a molded plastic hub or bushing having sufficient tensile strength to prevent the wood or fiber body portion of the wheel from being shifted on the bushing and at the same time having sufficient resiliency to absorb vibrations transmitted thereto either by the wood or fiber body portion of the roller or by the roller bearings. By absorbing the vibrations noted above, the resilient bushing entirely eliminates the previously noted "crying" noise and in fact produces a completely noiseless roller skate wheel.

Further objects and advantages of the present invention will best be understood from the following specification taken in conjunction with the accompanying drawing in which:

Fig. 1 is an elevation side view of a roller skate wheel, embodying the present invention;

Fig. 2 is an enlarged sectional view of the roller wheel taken along lines 2—2 of Fig. 1 and illustrates the precision bearings mounted therein; and Fig. 3 is a perspective view of the roller wheel shown in Fig. 1.

Referring now to the drawing, it will be seen that the roller skate wheel, as illustrated, comprises a roller body or tread portion 10 and a plastic hub or bushing 11 which is molded directly to the roller 10 to form a unitary wheel structure. Preferably the roller 10 is made from hardwood, such as maple, although other materials may be used. For example, laminated wood, fiber or moldable materials may be used. In producing the roller portion 10 from hard maple, for example, it must be turned down on a lathe or formed in any desired manner into a cylinder of desired diameter and width so that the peripheral surface 17 will roll smoothly over the contacting surface of a roller rink floor. Concentrically with the peripheral surface 17, a hole is drilled through the central portion of the cylinder to form a relatively smooth central bore 12. Simultaneously therewith, or by separate operations, the sides 15 and 16 of the roller 10 are counterbored to form oppositely disposed annular shoulder portions 13 and 14. The roller 10 is thus prepared to receive the central hub or bushing 11.

The hub or bushing 11 is preferably formed of a cellulose-acetate-butyrate composition which is molded to the roller 10 under heat and pressure although other plastic materials having the characteristic noted below are also satisfactory. The molded cellulose-acetate-butyrate plastic material is somewhat resilient and tends to restore itself to its molded shape. This plastic material will flow freely when heated from 350° F. to 400° F. so that it may be injection molded at approximately 4,000 pounds per square inch into appropriate molding dies to form the bushing 11 illustrated in the drawing. Also, the plastic material, upon cooling, will assume the resilient characteristics noted above. It should be understood, however, that cellulose-acetate-butyrate plastic material will satisfactorily mold at temperatures ranging from 340° F. to 420° F. and at injection pressures ranging from 3,000 to 30,000 pounds per square inch. However, the previously noted temperatures and pressures are preferable. Plastic materials having the above noted characteristics are well-known and available on the market. For example, one type of cellulose-acetate-butyrate plastic material having the foregoing characteristics is manufactured under the trade name "Tenite #II," by the Eastman Kodak Co. Since the above noted plastic material will flow freely at 350° and since it will rapidly cool after it is molded into shape, it will not burn or char the wood roller 10 during the molding process.

In the molding process, the finished roller body portion 10 is placed into the molding dies of a conventional plastic molding machine. These molds must be constructed and arranged so that the roller 10 is held concentrically on a central core of dies which are provided with surface configurations conforming to the inner surface of the bushing 11 as is illustrated in Fig. 2. About one-third of an ounce of the plastic material heated to the proper temperature is then forced and injection molded at 3,000 pounds per square inch through the central core of the molding dies to form the bushing 11 as illustrated. As the bushing 11 cools, it adheres to and becomes an integral part of the wood roller 10. Since the molding dies permit the plastic material to be forced into the annular shoulder portions 13 and 14 on the opposite sides 15 and 16 of the roller 10 to form flange members 23 and 24, axial side thrust between the bushing 11 and the roller 10 is prevented. Also, the resilient characteristics of the molded plastic material prevents the roller 10 from separating from the bushing 11 incident to the contraction and expansion of the wood roller due to variations in the moisture content of the wood.

In molding the plastic material to form the bushing 11, an annular rib or shoulder portion 18 is formed substantially mid-way between the opposite ends of the bushing in order to provide a spacer ring that will retain the oppositely disposed precision bearings 21 and 22 in the proper position in the bushing after they have been inserted therein. The rib 18 also prevents the bearings from being pulled out of the wheel after the wheel has been assembled on a roller skate. Inasmuch as the plastic bushing 11 is somewhat resilient, the diameter of the main inner peripheral surface 19 and 20 thereof, which forms the seats for the roller bearings 21 and 22, may be molded so that they are slightly less in diameter than the actual diameter of the roller bearings 21 and 22. It should be understood, however, that very close tolerances may be obtained in the molding process, but it is preferable to have the diameter of the bushing 11 slightly smaller than the outside diameter of the bearings 21 and 22. Consequently, when the bearings 21 and 22 are pressed into place in the ends of the bushing 11, they are firmly gripped by the resilient bushing 11. With this arrangement the oppositely disposed bearings 21 and 22 on the roller skate wheel will be firmly held in the bushing 11 and, consequently, they will not be easily dislodged when an attempt is made to assemble roller wheel and bearings on the axle of a roller skate. Furthermore, due to the resilient characteristics of the molded bushing 11, the bearings 21 and 22 will automatically assume correct axial and spaced-apart perpendicular alignment when the wheel and bearings are mounted on a roller skate axle.

From the foregoing description it is apparent that a light-weight roller skate wheel has been provided by utilizing a plastic bushing instead of metal bushings heretofore used. It should also be understood that due to the resilient characteristics of the plastic bushing, the "crying" noise, previously noted, is entirely eliminated, inasmuch as the bushing absorbs substantially all of the vibrations set-up between the wood body portion of the roller and the bushing, between the bushing and the precision bearings and between the bearings and the axle of the roller skate.

While there has been described what is at the present considered the preferred embodiment of the invention it will be understood that various modifications may be made therein which are within the true spirit and scope of the invention.

What is claimed is:

1. A roller skate wheel comprising, in combination, a roller having a central opening therethrough along the axis of said roller, a resilient bushing consisting essentially of a body of plastic material pressure molded directly to said roller central opening and having a central axial bore therethrough, flange members formed at opposite ends of said resilient bushing molded integral therewith and radially extending along opposite sides of said roller to form annular retaining rings in order to restrain relative axial movement between said roller and said resilient bushing, roller bearing members, said central bore of said resilient plastic bushing having a diameter less than the diameter of said bearing members whereby said bearing members may be pressed into and resiliently secured in said central bore of said bushing, and a rib member in said central bore of said bushing formed integrally therewith between opposite ends thereof.

2. A roller skate comprising, in combination, a roller having a central opening therethrough, a resilient bushing consisting of a body of plastic material pressure molded directly in place to form a resilient sleeve in said roller central opening and having a central bore therethrough, flange members formed at opposite ends of said resilient bushing molded integrally therewith and radially extending along opposite sides of said roller to form annular retaining rings of greater diameter than the diameter of said opening in said roller, said central bore of said resilient plastic bushing having a diameter less than the diameter of said central opening in said roller and having a diameter less than the diameter of precision bearings which it is adapted to receive, said plastic bushing being of sufficient resiliency to permit said precision bearings to be pressed into place in said central bore of said bushing and to be resiliently supported therein to absorb any vibrations transmitted thereto, and a rib member integrally formed in said central bore of said bushing between opposite ends thereof.

3. A roller skate wheel comprising, in combination, a cylindrical body portion having a central axial bore therethrough concentric with the peripheral surface of said cylindrical body portion, oppositely disposed annular cut-outs in said body portion adjacent the opposite ends of said bore, a cylindrical resilient bushing consisting essentially of plastic material intimately bonded and united by pressure molding concentrically with said central bore to said body portion with radially extending flange members cooperating with said oppositely disposed annular cut-outs, said molded bushing having an axial opening therethrough concentric with said peripheral body surface which is slightly smaller in diameter than the diameter of precision bearings adapted to be pressed thereinto at opposite ends of said bushing whereby said bearings are resiliently held in place, and a rib member formed in said bushing between the opposite ends thereof.

4. A roller skate wheel comprising, in combination, a cylindrical body portion having a central axial bore therethrough concentric with the peripheral surface of said cylindrical body portion, a cylindrical resilient bushing intimately bonded and united concentrically with said central bore to said body portion, said bushing consisting essentially of a body of thermoplastic material molded in place on said body portion and having an axial opening therethrough concentric with said peripheral body surface and adapted to receive precision bearings inserted therein from opposite ends of said bushing whereby said bearings are resiliently held in place in said plastic bushing, said resiliency of said bushing absorbing vibrations transmitted thereto, and a rib member formed in said bushing between the opposite ends thereof.

5. A roller skate wheel comprising, in combination, a roller having a central opening therethrough, a resilient bushing consisting essentially of a body of plastic material pressure molded directly in place in said roller central opening and having a central bore therethrough, flanges formed at opposite ends of said bushing molded integrally therewith and radially extending along opposite sides of said wood roller to form annular retaining rings of greater diameter than the diameter of said opening in said roller, said central bore of said plastic bushing being adapted to receive precision bearings at opposite ends thereof, and a rib member integrally molded in said central bore to limit longitudinal movement of said bushing on said bearings.

6. The roller skate wheel of claim 2 wherein said resilient plastic bushing consists essentially of cellulose-acetate-butyrate.

7. The roller skate wheel of claim 2 wherein said resilient plastic bushing is molded to said roller at temperatures between 350° F. and 400° F.

References Cited in the file of this patent

UNITED STATES PATENTS

| Number | Name | Date |
|---|---|---|
| 1,209,259 | Busch | Dec. 19, 1916 |
| 1,392,174 | Kempton | Sept. 27, 1921 |
| 1,536,410 | Rockwood | May 5, 1925 |
| 2,135,380 | Benge | Nov. 1, 1938 |
| 2,262,714 | Ware | Nov. 11, 1941 |
| 2,276,143 | Bell | Mar. 10, 1942 |
| 2,307,874 | Bilde | Jan. 12, 1943 |
| 2,440,650 | Batesole | Apr. 27, 1948 |
| 2,534,401 | Blaes | Dec. 19, 1950 |
| 2,599,540 | Brown et al. | June 10, 1952 |